(12) United States Patent
Henriksson et al.

(10) Patent No.: US 6,963,586 B2
(45) Date of Patent: Nov. 8, 2005

(54) METHOD AND APPARATUS FOR GENERAL-PURPOSE PACKET RECEPTION PROCESSING

(75) Inventors: Tomas Henriksson, Linkoping (SE); Dake Liu, Linkoping (SE); Harald Bergh, Rönuiuge (SE)

(73) Assignee: VIA Technologies, Inc., Taipei (TW)

( * ) Notice: Subject to any disclaimer, the term of this patent is extended or adjusted under 35 U.S.C. 154(b) by 891 days.

(21) Appl. No.: 09/934,372

(22) Filed: Aug. 21, 2001

(65) Prior Publication Data

US 2003/0039247 A1 Feb. 27, 2003

(51) Int. Cl.⁷ ............................................. H04J 3/26
(52) U.S. Cl. ..................... 370/469; 370/474
(58) Field of Search ................. 370/392, 393, 370/469, 474, 476

(56) References Cited

U.S. PATENT DOCUMENTS

| | | | |
|---|---|---|---|
| 6,643,710 B1 * | 11/2003 | Thorne et al. | 709/250 |
| 6,775,286 B1 * | 8/2004 | Goeury | 370/392 |
| 6,853,385 B1 * | 2/2005 | MacInnis et al. | 345/629 |
| 2003/0161289 A1 * | 8/2003 | Abrol et al. | 370/338 |

OTHER PUBLICATIONS

"Fast CRC Calculation", R.J. Glaise and X. Jacquart, *Proceedings, 1993 IEEE International Conference on Computer Design: VLSI in Computers and Processors*, Cambridge Massachusetts, pp. 602-605.

Request For Comments 1936 entitled "Implementing the Internet Checksum in Hardware", J. Touch and B. Parham, Apr. 1996, published at http://www.ietf.org/rfc/rfc1936.txt.

* cited by examiner

Primary Examiner—Melvin Marcelo
(74) Attorney, Agent, or Firm—Cooper & Dunham LLP

(57) ABSTRACT

A protocol processor for processing first header information of a reception packet to provide instructions for processing second header data of a reception packet is provided. For efficient protocol processing, special hardware architectures are necessary. Hardware architectures for dynamic length input buffer, no penalty conditional jump, one clock-cycle case-based jump, accumulated partial comparison, and integrated layer processing on-the-fly are described. The architectures are used in a domain-specific protocol processor, which is based on program controlled execution. The processor does not operate on data stored in a memory, but on an incoming packet-flow with constant speed. The processor performs every instruction in one clock-cycle, including conditional jump (taken and not taken) and case based jump.

28 Claims, 11 Drawing Sheets

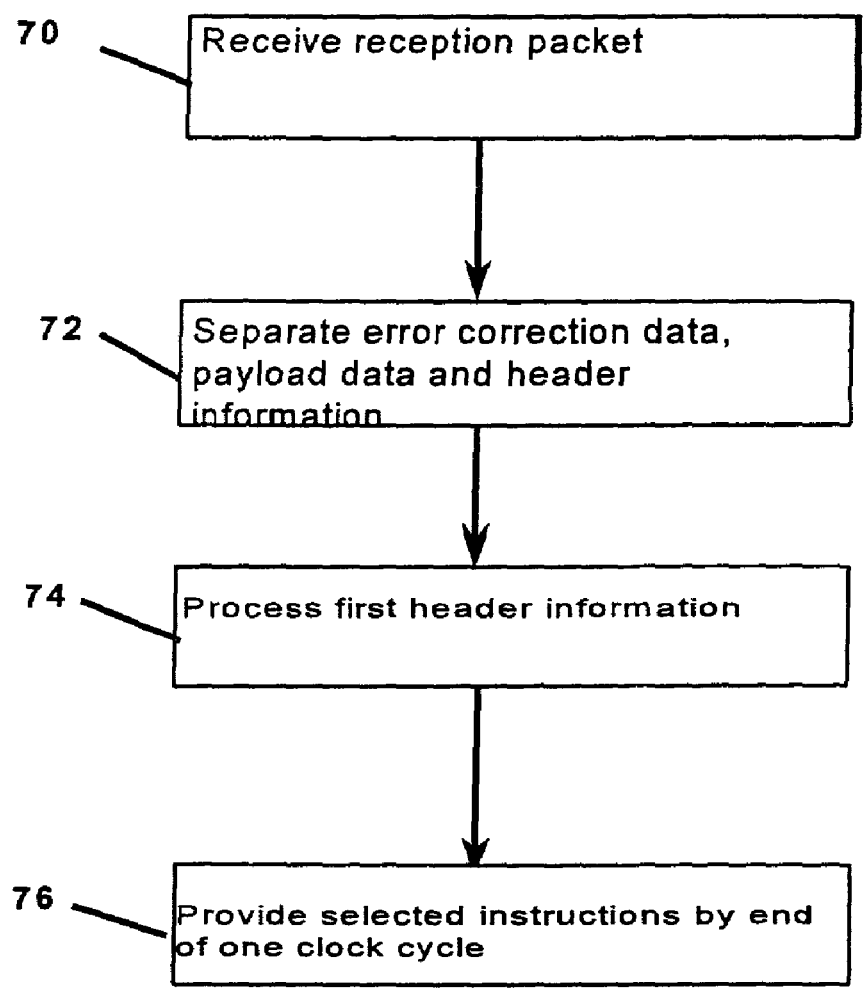

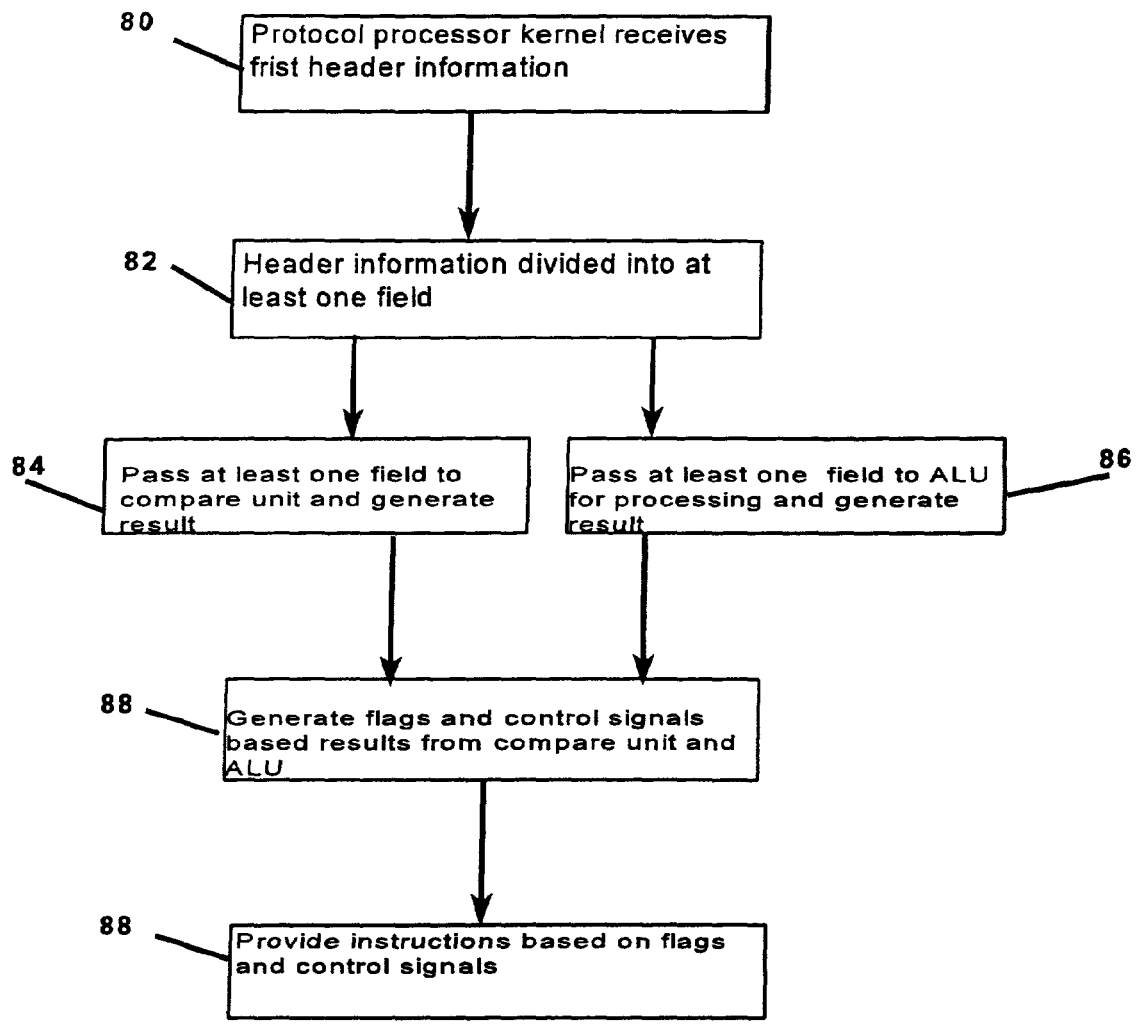

PROCEED TO STEP 90 in FIGURE 9

METHOD AND APPARATUS FOR GENERAL-PURPOSE PACKET RECEPTION PROCESSING

BACKGROUND OF THE INVENTION

The present application relates to a reception packet processor, and more specifically to a protocol processor for processing in one clock cycle first header information of a reception packet to provide by the end of the one clock cycle selected instructions for processing second header information.

Computer and data communication have been one of the dominant areas in the electronics market. Computer and data communication is based on packet processing and routing. In all packet-based communications, packet processing is defined to handle incoming packets, including de-framing, field search, field extraction, and payload handling. At one side, the packet processes are performed either in terminals on layer 2-4 on the ISO-OSI reference model or in routers on layer 2-3. At another side, the packet processing is also required on application layers above TCP/UDP, for example the MPEG packet processing. In general, three kinds of processes are handled by a communication system in the baseband: channel and packet processing, data processing, and voice/image processing. Therefore, packet processing generally is recognized as one of the most important activities in computer and communication industries.

Traditionally this processing has been implemented by fixed function application specific integrated circuits ("ASICs") and programmable general purpose processors. The ASICs typically handle layer 2 (e.g. Ethernet) functionality, while the general purpose processors handle layer 3 and 4 (e.g. TCP/IP).

As bit rates on the communication networks increase to several Gigabits per second and protocols keep evolving, these traditional implementations fail to serve adequately as processing resources. The fixed function ASICs cannot handle updating of protocol standards and the programmable general-purpose processors cannot keep up with the speed requirement. A new concept is to make domain-specific protocol processors, which are flexible within the protocol processing area and are still fast enough.

Another bottleneck in the operation of communication terminals exists. Low power consumption is required for a network terminal (NT) connected to a high speed network. The conflict of the high speed network and low speed payload process cannot be fixed by a general purpose processor. Therefore, a protocol processor is necessary to separate the protocol processing and the processing of the payload.

Since 1999, some new concepts for packet reception processing have been presented. Coresma, Agere, C-Port and Intel all have presented processors for this task. No common terminology has developed so far and network processors, protocol processors, and pattern processors can all be found in the literature. All processors from the companies mentioned include more functionality than the packet reception processing, for example packet switching and packet compiling. Also, all processors mentioned above are based on general purpose CPU with protocol processing adaptations. Obviously, protocol processing is not deeply optimized and no solution is the best for network terminals.

Since packet reception processing is an integral part of portable battery-driven network terminals, low-power consumption, small silicon area, and minimum process delay time are essential. This also is important for network infrastructures because several packet reception processing units can be placed on the same chip in a switch. Considering this fact a small silicon area is required as well. To avoid buffering an incoming packet, which creates delay and uses memory, on-the-fly operation is highly desired. However, true on-the-fly processing is very hard to achieve because of the required flexibility. The implementation must be able to adapt to several layer (2-4 of OSI) protocols and future versions. Also application layer protocols (e.g. RTP or MPEG packets) should be considered. This means that implementing true on-the-fly package reception processing could be very complex and the requirements of low-power consumption and small silicon area cannot be fulfilled. Hence there is a need for an "almost" on-the-fly processing implementation.

The largest problem when trying to fulfill all the requirements is to find a hardware architecture that can perform the processing on-the-fly. As already stated, true on-the-fly processing is too expensive to achieve when flexibility is demanded. Instead, pseudo-on-the-fly processing is required, that is, the processor is allowed to delay some tasks for some clock-cycles if the tasks can be performed later on. This is necessary when many small header fields are present and the processor parallelism simply is not enough to take care of them all at one time.

Another problem arises from the fact that, in packet reception processing, conditional jumps and case based jumps are frequently used. To succeed with pseudo-on the-fly processing, the consumed clock-cycles must be minimal and the same, independent of whether jumps are taken or not.

A further problem arises from the fact that in some protocols, very long fields have to be compared using several values. Having huge comparators is not acceptable, since the delay is too long and they would have a negative impact on the silicon area.

BRIEF DESCRIPTION OF THE DRAWINGS

FIG. 7 is a flow chart illustrating a method of decoding header information of a reception packet according to an embodiment of the present invention.

FIG. 8 is a flow chart illustrating in further detail a method for decoding header information of a reception packet according to an embodiment of the present invention.

SUMMARY OF THE INVENTION

Figure 1:
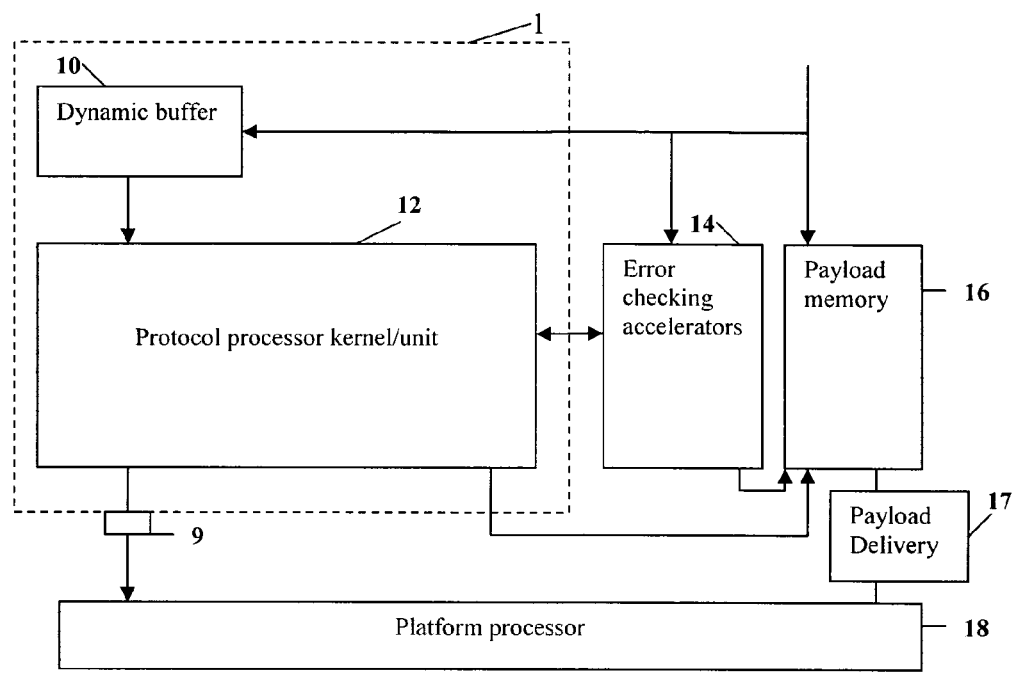
FIG. 1 is a block diagram illustrating a protocol processor according to the present invention.

A method of processing first header information of a reception packet to provide instruction regarding processing of second header information includes separating error correction data, payload data and first header information from a reception packet, processing in one clock cycle the first header information in a protocol processor unit to provide by the end of the one clock cycle selected instructions for processing second header information. The method may further include generating payload flags based on the selected instructions, wherein the flags are used by execution units for processing the accompanying payload data. The selected instructions may be stored in at least one look up tables wherein the selected instructions may be provided based on results of the processing of the first header information. The second header information may be header information immediately following the first header information.

The method may include separating at least one field in the first header information for decoding, wherein the processing includes one of comparing the at least one field to predetermined data and processing the at least one field in an arithmetic and logic unit, generating control signals and flags based on results of the comparing and processing, matching the control signals and flags to instructions provided in a first lookup table and providing the selected instructions for processing the second header information based on the matched control signals and flags. The method may include separating a plurality of fields from the first header information, including at least a first field and a second field, where the first field is compared to the predetermined data, and the second field is processed in the arithmetic and logic unit.

The method may include separating a plurality of fields in the first header information, comparing the plurality of fields with a plurality of parameters supplied from a second look-up table, simultaneously, using a plurality of comparators in a compare unit, generating a match flag indicating a match between at least one of the plurality of fields and one of the plurality of parameters, generating an address based on a result of the comparing, matching the address to a value in a third look up table and using the matched value and the match flag to provide instructions for processing the second header information. The third look up table may include a plurality of individual look up tables, wherein a first control signal provided from an instruction decoder selects one of the plurality of individual lookup tables in the third look up table and the address is matched to the value in the selected individual lookup table.

The step of comparing the at least one field may include comparing a portion of the at least one field to the predetermined value when the at least one field is longer than a length of a comparator to generate a partial comparison result, outputting the partial comparison result when a previous partial comparison result is of a predetermined value and repeating the comparing for each portion of the at least one field.

Margins between protocol layers of the header information may be eliminated prior to processing.

The error detection data may be processed in parallel simultaneously with the processing of the header information.

A protocol processor for processing first header information of a reception packet to provide instructions for processing second header information includes a buffer adapted to buffer a header information unit separated out from a reception packet, a protocol processor unit adapted to process, in one clock cycle, the first header information sent from the buffer to provide, by an end of the one clock cycle, instructions regarding processing of the second header information of the reception packet. The protocol processor may include a payload flag generating unit to generate payload flags based on the instructions, wherein the payload flags are used by execution units to guide processing of the accompanying payload data of the reception packet. The instructions may be stored in at least one look up table and provided based on results of processing the first header information. The second header information may be header information immediately following the first header information.

The protocol processor may include a multiple field extractor adapted to extract at least one field of the first header information, where the at least one field is passed to one of a compare unit adapted to compare the at least one field to a predetermined value and an arithmetic and logic unit adapted to process the at least one field to provide updated connection state variables which are stored in a register file and arithmetic and logic unit flags, a program control flag generation unit adapted to generate control signals and flags based on a result from the compare unit and the flags and state variables provided by the arithmetic logic unit and a program and instruction decoding unit adapted to match (a) the control signals and flags generated by the program control flag generating unit and (b) instructions in a first look up table, and to output selected instructions that match the control signals and flags, wherein the selected instructions are used to process the second header information. The multiple field extractor may extract a plurality of fields from the first header information including at least a first field and a second field, where the compare unit compares the first field to the predetermined data, and the arithmetic and logic unit processes the second field to provide updated connection state variables which are stored in the register file and arithmetic and logic unit flags.

The buffer may be capable of buffering data words of different sizes and may include a plurality of registers, one of the plurality of registers storing the first header information separated out from the reception packet being processed, and other ones of the plurality of registers being used to buffer header information when necessary.

The program and instruction decoding unit may include a next program counter calculation unit adapted to determined a next program counter value based on the control signals and flags provided by the program control flag generation unit, a program counter adapted to receive the next program counter value provided by the next program counter calculation unit and determine a program counter value based on the next program counter value, wherein the first lookup table matches (a) the program counter value provided by the program counter to (b) a selected instruction, and an instruction decoder which receives the selected instruction from the first lookup table and decodes the instruction to provide decoded instructions used to decode the second header information.

The protocol processor may include a plurality of comparators adapted to perform a plurality of comparisons located in the compare unit, a second look up table which receives a vector input and outputs a vector, parameters of which the at least one field is compared to using the plurality of comparators and a flag to address translation unit which receives the result of the comparisons and generates a match flag indicating at least one of the plurality of parameters matches the at least one field of the first header information and an address corresponding to another flag generated based on a result of the multiple comparisons, a third look up table which receives the address from the flag to address translation unit which is matched to a value in a third look up table; wherein the value matched in the third look up table and the match flag are used to provide instructions for processing the second header information.

The third look up table may include a plurality of individual look up tables and a first control signal selects one of the plurality of look up tables and the address is matched to the value in the selected look up table.

The compare unit may compare a first section of the at least one field to the predetermined value when the at least one field is longer than a comparator to produce a partial comparison result, output the partial comparison result when a previous partial comparison result is of a predetermine value and repeat the comparison for every section of the at least one field.

The error correction accelerator unit may be adapted to process error correction data in parallel with the processing of first header information in the protocol processor unit.

The margins between protocol layers in the first header information may be eliminated prior to processing in the protocol processor unit.

A program storage medium readable by a processor, tangibly embodying a program of instructions executed by the processor to perform method steps for processing first header information of a reception packet to provide instruction regarding processing of second header information, wherein the method steps include separating error correction data, payload data and header information from the reception packet; processing in one clock cycle the first header information in a protocol processor unit to provide by the end of the one clock cycle selected instructions for decoding second header information. The method steps may include a payload flag generating step for generating payload flags based on the selected instructions, wherein the payload flags are used by execution units to process the payload data. The selected instructions may be stored in at least one look up table and provided based on results of the processing of the first header information. The second header information may be header information immediately following the first header information.

DETAILED DESCRIPTION

Certain functions are necessary in order to provide for a processor which is flexible enough to accommodate multiple protocols including not yet developed protocols and operates fast enough to accommodate the high data transfer rates of modem communications. Deframing is essential to packet reception processing. Deframing includes:
1 Field extraction
2 Field Comparison
3 Demultiplexing The claimed architecture can perform most of the deframing on-the-fly. As will be mentioned below, the claimed architecture preferably is a co-processor or an accelerator attached to a platform payload processor. The platform payload processor will take over the small miscellaneous part according to the optimization process during the job allocation step. For example, the platform processor will control window size management in the TCP.

The claimed invention covers the following packet reception processes:
1 Ethernet IP/TCP/UDP (layer 2-4)
2 WLAN+IP/TCP/UDP (layer 2-4 )
3 Bluetooth
4 Digital mobile phone systems
5 Digital TV stream deframing
6 Image phone Apart from these well-known protocols, emerging protocols are also within the scope of the process.

In most protocols different kinds of reliable channel coding, for example, checksum and CRC (Cyclic Redundancy Check), are applied. In the present architecture, the checksum and CRC are executed in parallel on-the-fly and give the result of checking as an instruction to accept or to discard the payload as soon as the package is received. The error check on-the-fly gives a chance to eliminate the incoming data buffer and keep only the payload buffer.

The payload data must be delivered to applications. This is done through an address pointer, which points out where in the payload buffer the latest arrived payload is stored. A payload delivery unit 17 will manage the address order/position as well as the recognition of different applications (data, or voice, or a frame of image). Therefore, support for the reassembly functionality is included. Discarding of incorrect payload is managed in this part by a payload address history table which may be a part of the payload processor 18 or may be in a separate component controlled by the payload processor 18.

To satisfy the flexibility demand and the functionality specified in the previous section, a programmable and configurable protocol processor 1 according to an embodiment of the present invention is explained generally with reference to FIG. 1. The computing intensive checksum and CRC calculation are not performed in the programmable protocol processor kernel or unit 12, but rather in parallel attached units, namely error checking accelerators 14. The checksum, CRC, and the payload memory 16 are well known to those skilled in the art and need not be described further. See for example, "Fast CRC Calculation, R. J. Glaise and X. Jacquart, *IEEE International Conference on Computer Design: VLSI in Computers and Processors*, Cambrige, Mass., U.S.A., 1993, pages 602–605 and RFC 1936, http://www.ietf.org/rfc/rfc1936.txt.

The unique architecture of a protocol processor in accordance with the present invention is that the protocol processor allows for more flexible and more efficient processing of reception packets. The flexibility and speed of this processing allows a protocol processor according to the present invention to process, or decode, first header information of the reception packet in one clock cycle and provide, by the end of the one clock cycle, instructions for processing, or decoding, second header information regardless of what instruction is to be executed.

In order to provide for this pseudo on-the-fly processing, the protocol processor must be able to accommodate a no penalty conditional jump, which is only possible if instruction fetch, decoding and execution are performed in one clock-cycle. To make this possible, the program which provides instructions regarding the jump is not stored in a traditional memory, but in a look-up table. This is acceptable because the program size in this claimed architecture is much smaller than any protocol stack, running in a CPU based processor. Also, registers in which the program is stored can be shut down for periods of time because this information is read only during the execution phase.

In order to execute a case based jump in one clock-cycle, several comparisons must be performed at the same time, followed by a conditional jump which depends on which one of the several comparison gives a match. To be able to do this, the program which provides instructions for performing the case based conditional jump is split into 3 parts. One part contains the case based jump control code and this part is preferably stored in the program look up table 42 (see FIG. 4). The second part, containing the values to which the header information is compared in the multiple comparisons is preferably stored in another look-up table, the parameter code book (PCB) 54 (see FIG. 5) and provides a vector output. The last part, containing the relative jump addresses, is preferably stored in yet another look-up table, the control code book (CCB) 50 (see FIG. 5).

As noted above, the programs for processing reception packets are provided in look up tables such as a program lookup table 42, the program control book 54 and the code control book 50 in order to allow for fetching decoding and execution of instructions in a single clock cycle. According to an embodiment of the present invention, the three look-up tables, used for program, parameter, and reference data storage, have slightly different behaviors. All three look-up tables are combinational. The program look-up table 42 has an address as input and provides an instruction as output. The PCB 54 contains several vectors and takes a vector number as input and gives the output as a vector, with all parameters of the specified vector. Each parameter is 32 bits, for example, since that is the TCP/IP word length, and the maximum number of parameters in each vector is the same as the number of comparators (n). The parameters may be of any size appropriate for a specific application. The CCB 50 contains several look up tables. One input specifies which table to use and another input specifies which value in that table to present on the output. The maximum number of values in each table in the CCB 50 is n. Each value, however, is only 8 bits, since it specifies a relative jump and the size of the program look-up table is 256 entries. Again, it must be noticed that all numbers used here are just examples and the principles are general. The number of vectors in the PCB 54 and tables in the CCB 50 decides how many case based jumps the program can contain. However, the vectors in the PCB 54 can also be used for other purposes, such as conditional jump if the extracted value does not exist in the vector.

The principle of dividing the program into separate pieces is developed in this solution. An instruction is stored in three look up tables. This technique merges multiple control steps in parallel and minimizes the data dependence induced performance penalty. This technique also minimizes the instruction storage size because every sub-file stored can be merged. In this way, the total number of combinations of instructions are much higher. The consequence is that the total size of the microinstructions for an application is much smaller than other solutions.

A protocol processor 1 of the present invention performs every instruction in one clock-cycle, including conditional jumps whether the jump is taken or not taken and case based jumps and is described generally with reference to FIG. 1.

The protocol processor 1 does not process data stored in a memory. Instead, data is received and processed via an input port at wire-speed. The protocol processor 1, that makes integrated layer pseudo on-the-fly processing possible, is briefly explained with reference to FIG. 1.

The dynamic buffer 10 receives input data and extracts the header of a reception packet for further processing. The protocol deframing process is performed in the protocol processor kernel or unit 12. The error check is separated and executed in parallel in checking accelerators 14. The access of the payload memory 16 will be instructed to accept payload as soon as the protocol processor kernel 12 tells the address and enable to the payload memory 16 on the fly. Data is buffered only when needed (for example, the IP address of the package is recognized). The outputs from the protocol processor 1 are payload flags to guide the memory access, data validation, and processing of the payload and are output via output terminal 9. These functions are performed in various execution units including the platform processor 18 and payload memory 16, for example. The flags are generated at the output terminal is response to instructions or control signals from the protocol processor kernel 12.

A method of processing first header information of a reception packet according to an embodiment of the present application is described with relation to FIG. 7. In step 70, the reception packet is received by a protocol processor. Error correction data, payload data and header information are separated from the reception packet at step 72. In step 74, first header information is processed in one clock cycle. The selected instructions are provided by the end of the one clock cycle in step 76. The first header information may be a first word of header information of a predetermined bit length. The second header information may be a second word of header information of the predetermined bit length immediately following the first header information. The method described in FIG. 7 would be suitable for application in the protocol processor 1 described with reference to FIG. 1, for example. While the steps of FIG. 7 are shown as separated, the processing occurs substantially simultaneously with reception of the header information. One word of the header information is received every clock cycle and an instruction is executed every clock cycle. It should be noted that proper error correction requires error correction data as well the rest of the reception packet which is checked for errors. After the entire header has been received and processed, payload flags may be output from the protocol processor to guide payload processing.

The method may be implemented in the form of a software application running on a computer system such as a mainframe, personal computer (PC), handheld computer, etc. Computer executable code adapted to perform each of the steps 70 to 76 of FIG. 7 is stored on a computer storage medium and run on the computer system.

The protocol processor kernel 12 consists of a control path and a data path. However it is very hard to separate the paths as the header of the packet can be seen as part of a program describing or instructing how to process the payload (on-the-fly data dependent control). This makes the data path part of the control path and data actually is part of the program. Some parts in the kernel are identifiable.

Figure 2:
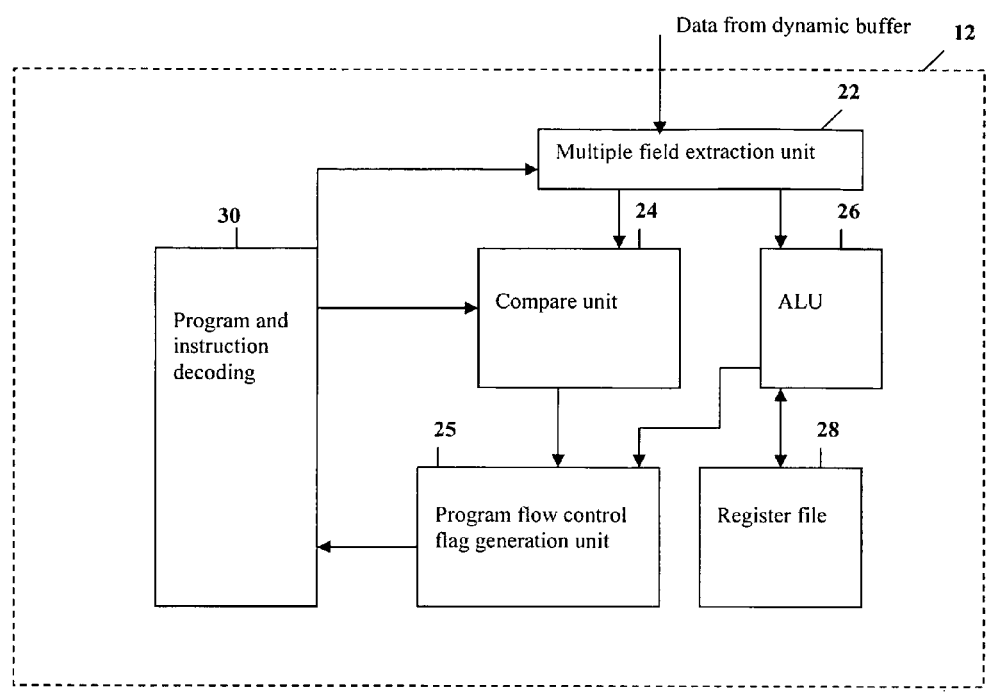
FIG. 2 is a block diagram illustrating a protocol processor unit of a protocol processor according to an embodiment of the present invention.

A more detailed view of the protocol processor kernel 12 can be seen in FIG. 2. Generally speaking, first header information, or a first word of header information from the dynamic buffer 10 is received and at least one field of the first header information is extracted by the multiple field extraction unit 22. The at least one field may go to the compare unit 24 for immediate program flow control. The at least one field may go to the arithmetic and logic unit ("ALU") 26 and be used by the ALU 26 and by the register file 28 primarily for updating connection state variables. ALU flags generated by the ALU 26 can also control the program flow. The compare unit 24, the ALU 26 and the register file 28 are controlled by a decoded instruction provided by the program and instruction decoding unit 30. Multiple fields may be extracted by the multiple field extraction unit 22 simultaneously, in which case a first field may be sent to the compare unit 24 and a second field may be sent to the ALU 26 for parallel processing which provides improved efficiency. The instructions provided by the instruction decoding unit are used for processing, or more specifically for decoding second header information, or a second word of header information in the next clock cycle. These instructions are executed in a single clock cycle such that by the end of the one clock cycle the compare unit and ALU, for example, have instructions for processing the second header information.

The multiple field extraction unit 22 extracts the at least one field from any position to any position in the incoming dynamic buffer unit 10 and sends the extracted fields to the compare unit 24 and/or the ALU 26, respectively. The compare unit 24 compares the arriving field to a built-in pattern from a program and instruction decoding unit 30. The built in pattern may also be provided by the PCB 54 when the pattern includes multiple parameters. Otherwise, a single parameter pattern may be stored in an instruction look up table of the program and instruction decoding unit 30, which will be described in more detail below. A compare result from the compare unit 24 is sent to the program flow control flag generation unit 25. Flags and controls for the next clock cycle are generated according to the computing in the ALU 26 or compare unit 24 on the fly and sent to the program and instruction decoding unit 30 to provide instructions. The instructions, or control signals, are used in the protocol processor to guide the ALU 26 and compare unit 24 for example, and may also be utilized to generate flags sent outside of the protocol processor to the platform processor 18 or payload memory 16 for example from output terminal 9. The register file 28 and the ALU 26 are well-known to those skilled in the art and are not described in detail. They are necessary to achieve the desired functionality and flexibility in the protocol processing. For example, certain protocols such as TCP require the use and storage of connection variables. The register file 28 and an extra memory (not shown) are used to save the connection state variables. The ALU 26 is mainly used to modify those connection state variables. The compare unit 24 illustrated in FIG. 2 alternatively may include a plurality of comparators for performing multiple comparisons simultaneously.

According to an embodiment of the protocol processor 1 the word length is 32 bits, but the hardware architecture is general and can work with any word length. In this example, the dynamic buffer 10 receives data in words of 32 bits. The interface between the dynamic buffer 10 and the multiple field extraction unit 22 is 5*32 bits, but the extracted fields passed to the compare unit 24 and ALU 26 are 32 bits wide. When choosing the word length, a trade-off between complexity and operation frequency must be done. Choosing a longer word length would imply that more data can be handled in each clock cycle and so the operation frequency could be lowered. However, to handle several header fields contemporaneously, more parallelism would be needed and the complexity would increase. On the other hand, choosing a shorter word length would imply that less data can be handled in each clock cycle and the operation frequency must be increased. It also means that the parallelism and thereby the complexity could be decreased, since only one or a few header fields would fit in into each data word. The programming and configuration is done by updating look-up tables, where the program is stored during execution. This is further explained below.

The protocol processor 1 can operate in two different modes. Either it can work as a stand-alone processor, which communicates with a host or platform processor 18 through communication channels as illustrated in FIG. 1 or it can work as a co-processor, where it is tightly integrated into the host processor. It is intended that the protocol processor 1 is integrated in a system-on-chip. The interaction between the protocol processor 1 and the host processor, or payload processor 18 must be regular. The protocol processor 1 works alone. The operation of the protocol processor 1 is substantially similar regardless of whether the protocol processor 1 is stand-alone or tightly integrated into a host processor except that communication between the protocol processor 1 and platform processor 18, for example, may be synchronous when the protocol processor and platform processor are tightly integrated. The interaction is defined by programmable flag-acknowledge signals.

A method of processing first header information to provide selected instructions according to an embodiment of the present application is explained with reference to FIG. 8. At step 80, first header information is received in a protocol processor kernel such as that described with reference to FIG. 1. At step 82, at least one field of the first header information is extracted. At step 84, the at least one field may be passed to a compare unit and compared to predetermined data provided by a program and instruction decoding unit or processed by an arithmetic logic unit, at step 86. At step 88, results of the comparing or processing steps are utilized to generate flags and control signals. At step 90, the flags and control signals are used to provide, by the end of one clock cycle, an instruction for processing second header information in the next clock cycle. The method would be applicable in the protocol processor kernel 12 described with reference to FIG. 2. It should be noted that multiple fields of the first header information may be extracted with one field being sent to the compare unit while another field may be sent to the ALU.

The method may be implemented in the form of a software application running on a computer system such as a mainframe, personal computer (PC), handheld computer, etc. Computer executable code adapted to perform each of the steps 80 to 90 of FIG. 8 is stored on a computer storage medium and run on the computer system.

Figure 3:
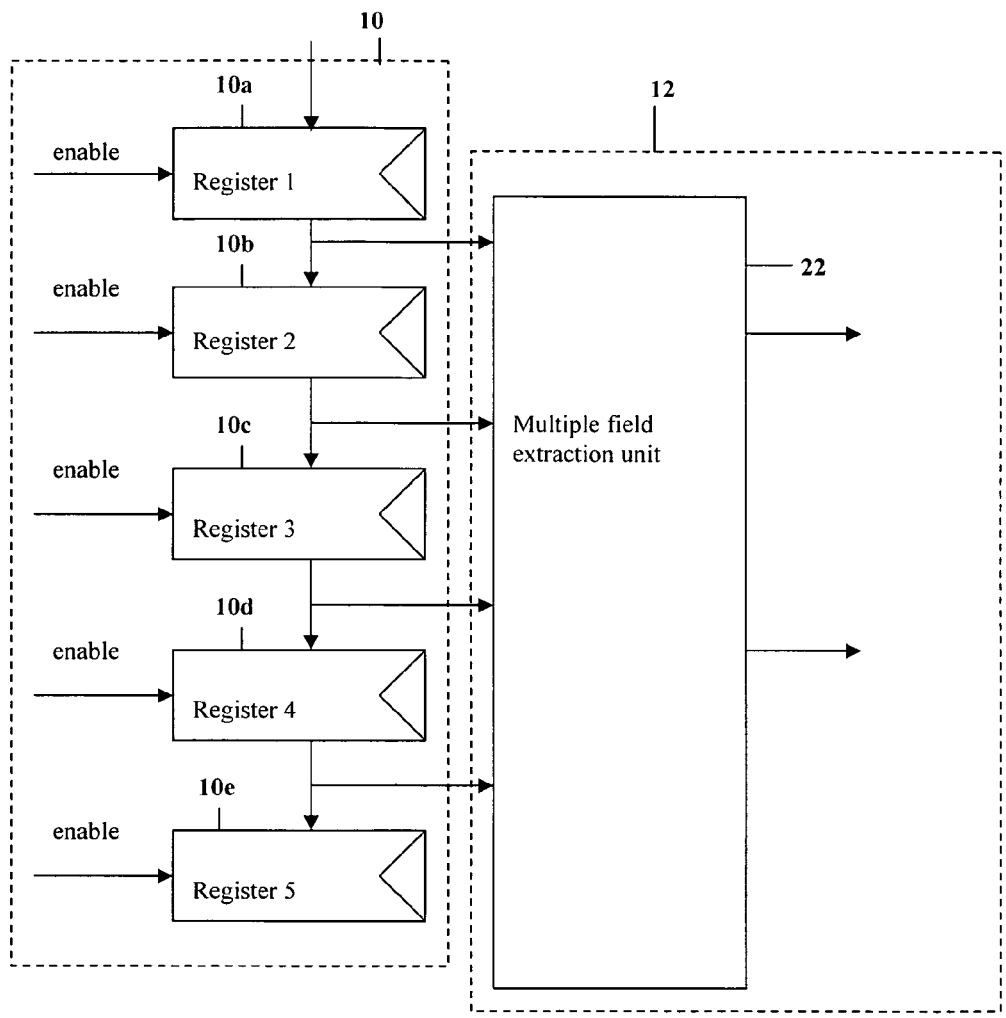
FIG. 3 is a block diagram illustrating a dynamic buffer unit of a protocol processor according to an embodiment of the present invention.

While the general operation of the protocol processor 1 and some of its components has been explained, a more detailed explanation is provided below. According to an embodiment of the present invention, the protocol processor 1 provides for pseudo on-the-fly processing of the header information from a received packet. To allow pseudo-on-the-fly processing, a buffer, more specifically a dynamic buffer 10, on the input port of the protocol processor 1 is used, as can be seen in FIG. 3. In this example, the dynamic buffer 10 consists of 5 registers, 10a–10e (32-bit of each). The number of registers and the register width are flexible according to specific applications. To achieve lower power consumption, registers 10b to 10e in the dynamic buffer 10 normally are not used, but registers 10b to 10e can be used according to the required field position to be compared. Registers 10b to 10e can also store 4 old words of data when necessary. The first register 10a is enabled for all header fields, but not for payload data. For example, if the header information of a reception packet includes header information in the Ethernet layer (14 byte header) and header information in the IP layer (20 byte header) the total size of the header information is 34 bytes. The protocol processor kernel 12 only processes header information of 32 bits at a time, for example. In this example, the IP destination address (DA) would be split into two words, with one word stored in register 10*a* and the second word stored in register 10*b*.

The multiple field extraction unit 22 of the protocol processor kernel 12 is attached to and following registers 10*a* to 10*e*, though the multiple field extraction unit 22 is actually not a part of the dynamic buffer 10. The multiple field extraction unit 22 can extract at least one data word, or field from outputs of the dynamic buffer. The at least one word goes to the compare unit 24 or to the ALU 26 and the register file 28. The multiple field extraction unit 22 may extract multiple data words in parallel from outputs of the dynamic buffer as well. In other words, the multiple field extraction unit 22 may extract multiple fields from the header information. Instructions from the program and instruction decoding unit 30 may be provided to the multiple field extraction unit 22 to guide extraction of appropriate fields. The multiple fields, or data words extracted by the multiple field extraction unit 22 may be provided to both the compare unit 24 and ALU 26 in parallel.

Figure 4:
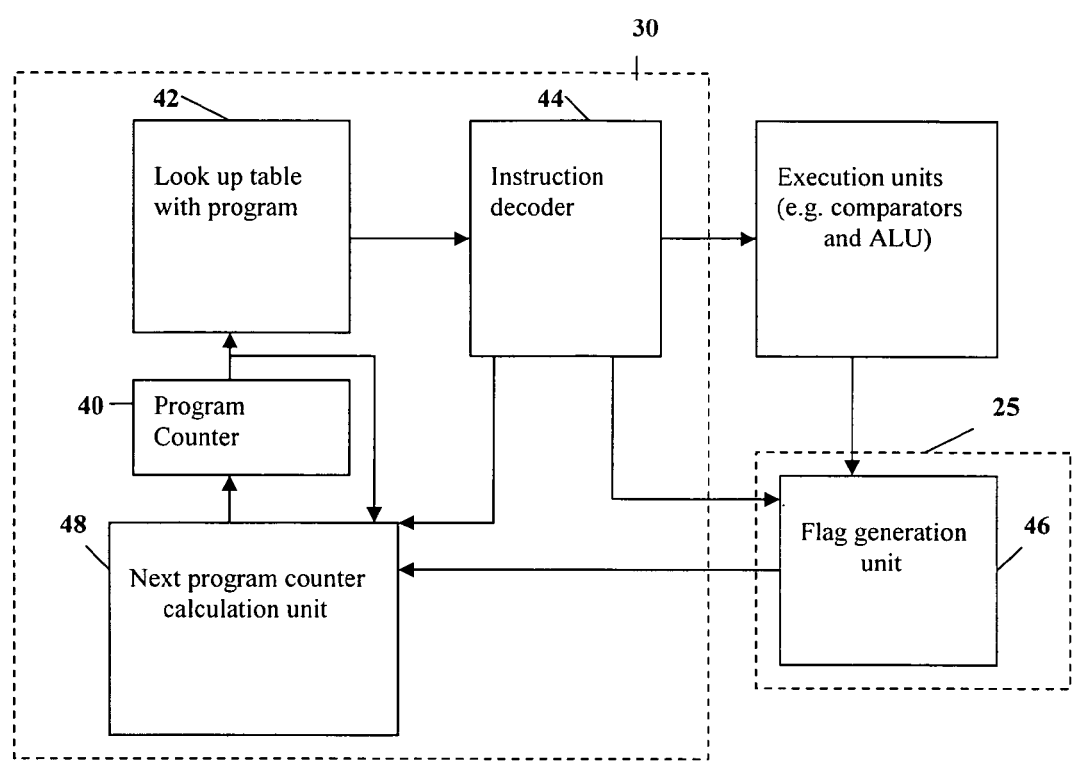
FIG. 4 is a block diagram illustrating a program and instruction decoding unit of a protocol processor unit according to an embodiment of the present invention.

The program and instruction decoding unit 30 of the protocol processor kernel 12 of FIG. 2 is further described with reference to FIG. 4. The program counter 40 points out an instruction in look-up table 42. This instruction is decoded by the instruction decoder 44 and control signals corresponding to the instruction are sent to control execution units such as to the compare unit 24 and the ALU 26. Instructions may also be sent to the output terminal 9 which in turn generates and outputs flags to guide other execution devices outside of the protocol processor 1 such as the payload processor 18 and the payload memory 16 as has been mentioned previously to provide for processing of the payload data. The flag generation unit 46, which is an element of the control program flow control flag generation unit 25 in FIG. 2, evaluates the outputs of the compare unit 24 and the ALU 26 and sends flags to the next program counter calculation unit 48. The next program counter calculation unit 48 calculates a next program counter value based on the flags and a control signal from the instruction decoder 44. This next program counter value is passed to the program counter 40 and is matched to an instruction in look up table 42. The flag generation unit 46 and the next program counter calculation unit 48 are also controlled by control signals from the instruction decoder 44. Using the look up table 42 to retrieve a desired instruction allows for efficiency in fetching instructions and aids in providing execution of instructions in a single clock cycle. Efficient decoding and fetching of instructions allows for a conditional jump to be performed in one clock cycle, rather than the multiple clock cycles required in traditional processors.

Figure 9:
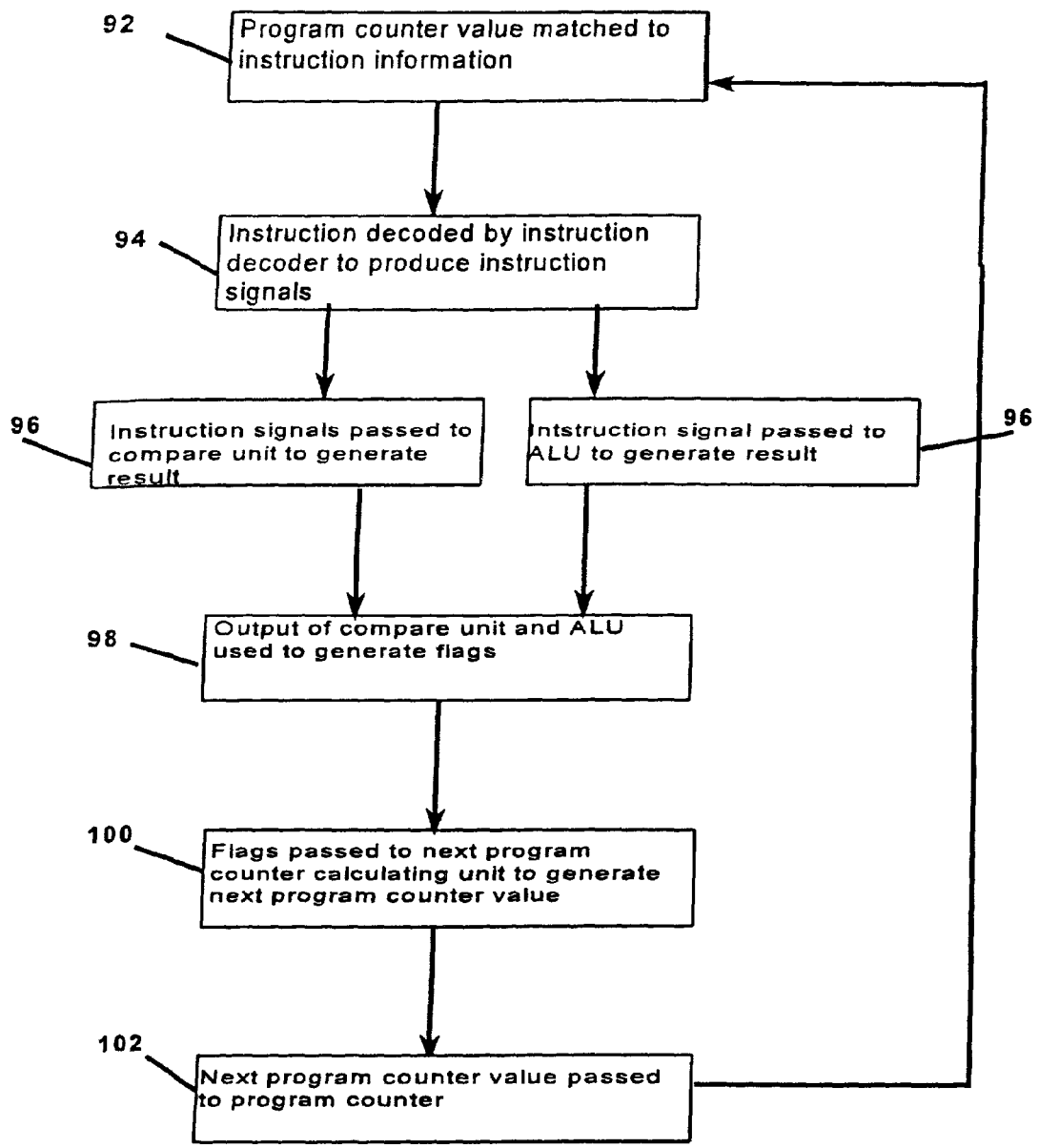
FIG. 9 is a flow chart illustrating a method of decoding header information of a reception packet while allowing for a conditional jump according to an embodiment of the present invention.

A method of processing first header information to provide instructions for processing second header information which allows for conditional jumps is explained with reference to FIG. 9. At step 92 a program counter value is matched to an instruction in a look-up table. The instruction is passed to an instruction decoder to generate decoded instructions or control signals in step 92. The decoded instructions are utilized to control various execution units including a compare unit and an ALU in step 94. Outputs of the compare unit and ALU are passed to a flag generating unit in step 96. Flags from the flag generating unit are passed to a next program counter calculating unit in step 98. A next program counter value is calculated using the flags passed to the next program counter calculating unit in step 100. At step 102, the new program counter value is passed to the program counter and can be matched to an instruction as in step 90. The method described above is similar to that which would be applied in the protocol processing kernel described with reference to FIG. 4.

The method may be implemented in the form of a software application running on a computer system such as a mainframe, personal computer (PC), handheld computer, etc. Computer executable code adapted to perform each of the steps 92 to 102 of FIG. 9 is stored on a computer storage medium and run on the computer system.

Figure 5:
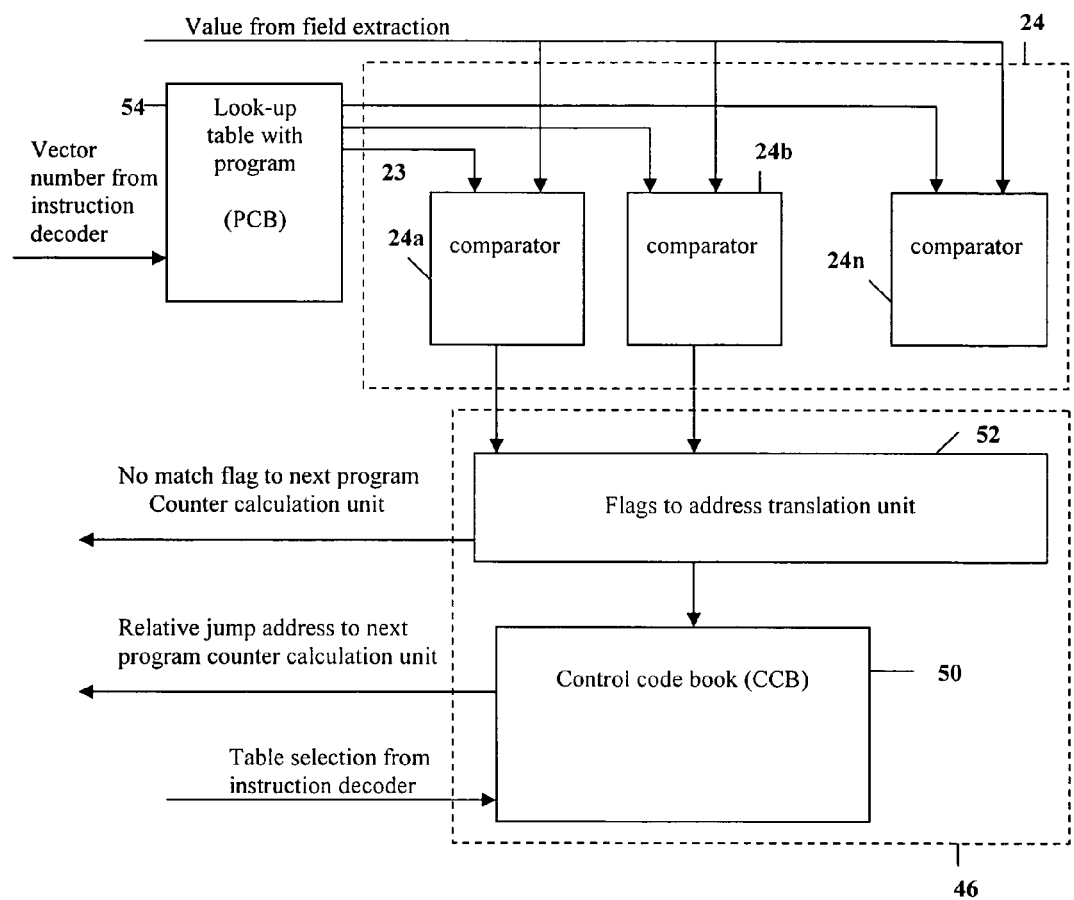
FIG. 5 is a detailed block diagram of a data path of a protocol processor unit of a protocol processor according to an embodiment of the present invention.

An embodiment of a protocol processor according to the present disclosure which allows case based conditional jumps is described in detail with reference to FIG. 5. The instruction decoder 44 of FIG. 4 provides a control signal which allows for a selection of a vector in the PCB 54. The predefined parameters from this vector are sent to the compare unit 24. In this embodiment, the compare unit 24 includes a plurality of n individual comparators, where n is an integer number of at least 1, 24*a*, 24*b* . . . 24*n*. In each comparator, 24*a* to 24*n*, parameters from PCB 54 are compared to the extracted values from the multiple field extraction unit 22 extracted from the header information of the reception packet. The results of this comparison are translated to an address via the flag to address translation unit 52. The flag to address translation unit 52 is an element of the flag generation unit 46 of FIG. 4. This address corresponds to one value from the CCB 50. The current instruction from the instruction decoder 44 indicates which table of a plurality of tables in the CCB 50 is used. Part of the information used to provide the instruction according to the protocol specification is sent to the next program counter calculation unit 48 from the CCB 50 based on the address from the flag to address translation unit 52 and the current instruction. Using this information, together with a match flag generated by the flag generation unit 46 which assures a match between at least one of the plurality of parameters and a field of the first header information, and the control signal from the instruction decoder 44, see FIG. 4, the next program counter value is calculated. The flag used to generate the address sent to the CCB 50 and the match flag sent to the next program counter calculator are not the same flag, but are both generated based on results of the comparing in the compare unit.

The case based jump execution excites the critical path of the processor and thus determines the maximum operation frequency. The critical path is from the program counter register through the program look-up table 42, the instruction decoder 44, the PCB 54, one comparator 24*a* to 24*n*, the flag to address translation unit 52, the CCB 50, and through the next program counter calculation unit 48, back to the program counter register 40.

Figure 10:
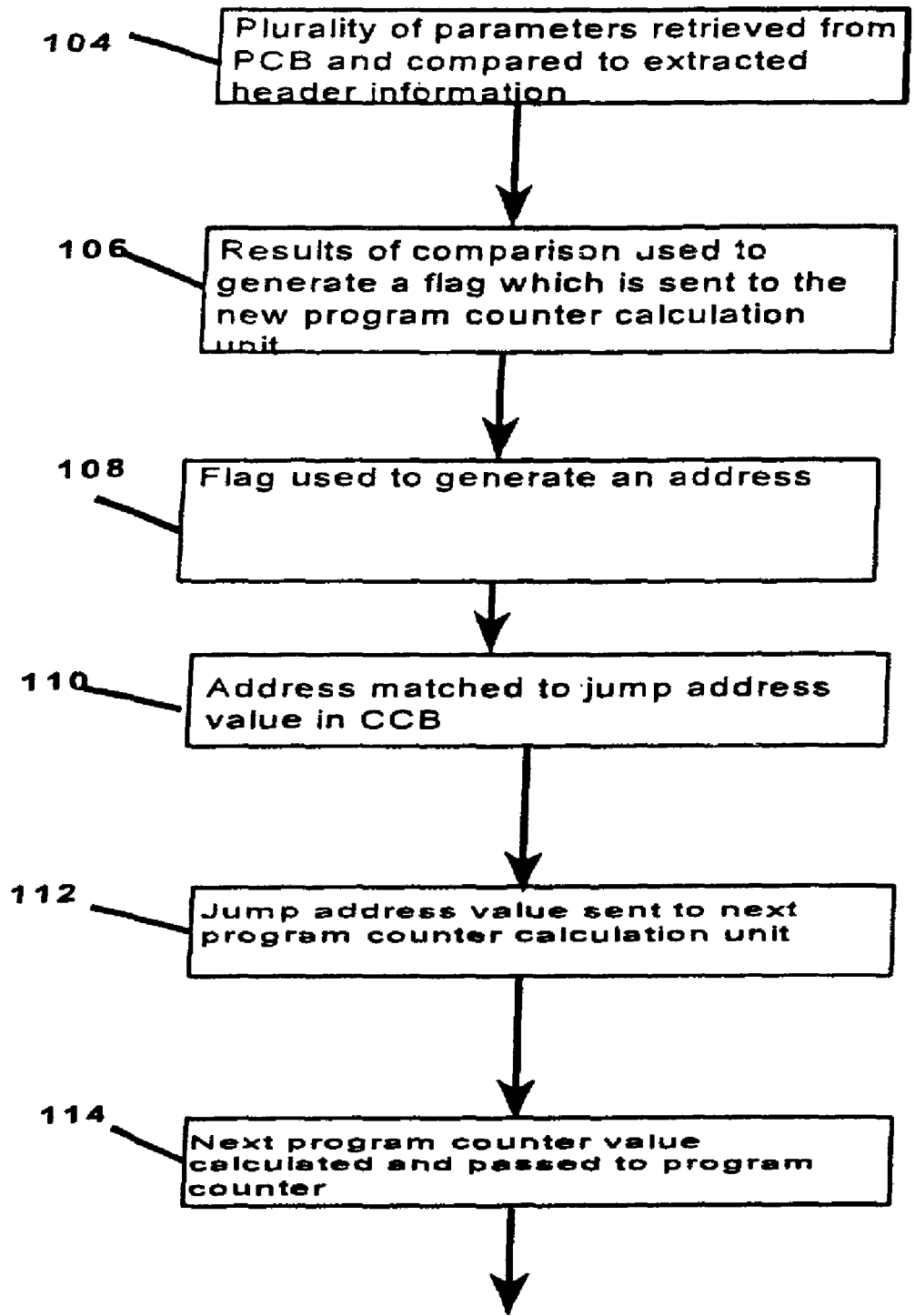
FIG. 10 is a flow chart illustrating a method decoding header information of a reception packet allowing for a case based conditional jump according to an embodiment of the present invention.

A method of processing first header information to provide instructions for processing second header information which allows for case based conditional jumps is explained with reference to FIG. 10. At step 104 a plurality parameters extracted from a vector provided by a second look-up table are compared to a plurality of fields extracted from header information of a reception packet. At step 106, the results of the comparisons are received by a flag to address translation unit to produce a match flag indicating a match in at least one of the comparisons and the flag is sent to a next program counter calculating unit. At step 108, an address is generated based on another flag in the flag to address translation unit.

At step 110, the address is sent to the CCB, a third look-up table and matched to a jump address value in the CCB. The CCB includes a plurality of individual look up tables, one of which is selected based on a control signal from an instruction decoder. At step 112 the jump address value is passed to the next program counter calculating unit to and used along with the match flag to provide a next program counter value. At step 114, the next program counter value is passed to the program counter and the method continues as in step 90 of FIG. 9. The method of FIG. 10 would be suitable for application by the protocol processor kernel of FIG. 5.

The method may be implemented in the form of a software application running on a computer system such as a mainframe, personal computer (PC), handheld computer, etc. Computer executable code adapted to perform each of the steps 104 to 114 of FIG. 10 is stored on a computer storage medium and run on the computer system.

Figures 6, 6B:
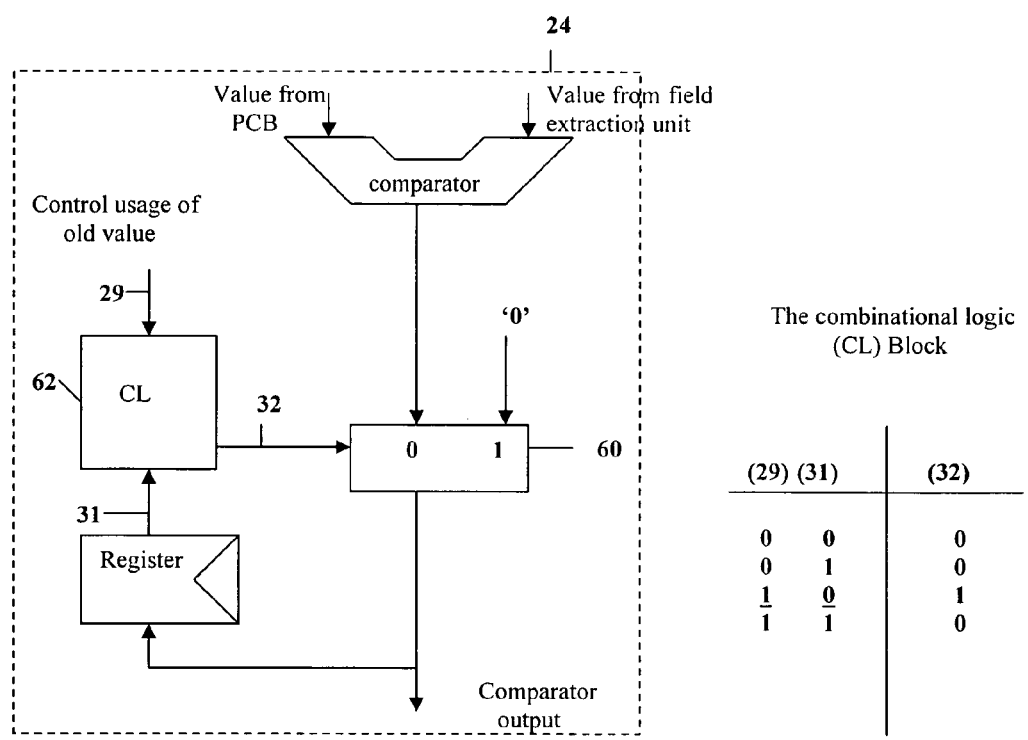
FIG. 6 is a detailed block diagram of a compare unit of a protocol processor unit according to an embodiment of the present invention.
FIG. 6B is an illustration of a truth table corresponding to an example of boolean logic utilized in a compare unit of a protocol processor unit according to an embodiment of the present invention.

As mentioned above, problems arise when long fields have to be compared by the processor (e.g. destination addresses in IPv6 of 128 bits). The comparison can be split up in time without losing any performance according to an embodiment of the present invention since data will arrive at fixed rate in words of finite length through the dynamic buffer 12 anyway, 32 bits for example. A compare unit 24 in which fields can be split up for comparison is described with reference to FIG. 6. By using several vectors in the PCB 54 for different parts of the field, the comparison can be performed partially and accumulated in the compare unit 24. The value from the PCB 54 is compared to the extracted value from the packet header which might be only a part of the total data in the header. An instruction from the instruction decoder indicates whether the comparison is a partial comparison. The result of this partial comparison can be used directly to provide instructions for processing the packet in the next clock cycle. The partial comparison result is used if a previous partial comparison result is a "1". If the result of the previous partial comparison result is a "0", then a "0" is output from the comparator. The final result will only be a "1" if all comparisons result in a "1". More specifically, multiplexor 60 is controlled using a control signal generated by the combinational logic unit 62 to output the partial comparison result, or a "0". FIG. 6B illustrates a truth table corresponding to an example of boolean logic utilized by the combinational logic unit 62.

Figure 11:
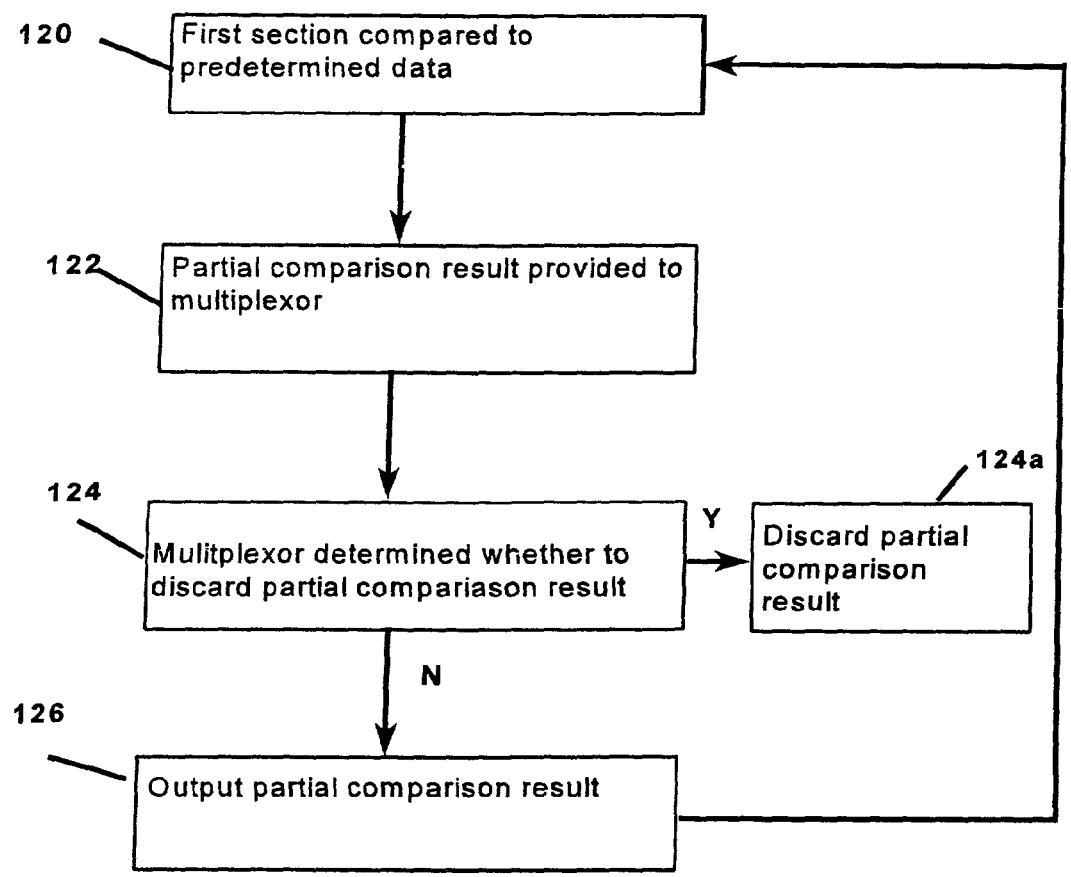
FIG. 11 is a flow chart illustrating a method of performing an accumulated partial comparison according to an embodiment of the present invention.

A method of comparing long fields of header information where the comparison is split up is explained with reference to FIG. 11. At step 120, a first section of the field is compared with the predetermined data. At step 122, the result of that partial comparison is provided to a multiplexor controlled by a control signal. At step 124, the multiplexor determines whether to discard the result of the partial comparison. The result of the partial comparison is always used unless the previous partial comparison result is a "0". The partial comparison result is discarded if appropriate at step 124a. Otherwise, the result of the partial comparison is output from the compare unit at step 126 and may be stored as a new previous partial comparison result. It should be understood that this process is repeated for each segment of the field.

The method may be implemented in the form of a software application running on a computer system such as a mainframe, personal computer (PC), handheld computer, etc. Computer executable code adapted to perform each of the steps 120 to 126 of FIG. 11 is stored on a computer storage medium and run on the computer system.

According to another embodiment of the present invention during packet reception it is possible to process all protocol layers of the header at the same time, which is desirable because all headers arrive in the beginning of the packet. Header fields continuously arrive at the dynamic buffer without interruption. These header fields are never physically separated as is common in other processors because can be continually decoded by the protocol processor. This is done by combining the architectures presented above with the appropriate program code and PCB and CCB configurations. Therefore the micro instruction can be compiled so that the margins between layers can be canceled and fields can be merged. In other words, the instructions provided by the look-up tables such as the PCB 54 and CCB 50 and program look up table 42 and provided to the execution units such as the compare unit 24 and the ALU 26 are provided such that when the compare unit 24, for example compares extracted values to the value provided by the look up tables, margins between protocol layers can be discarded. The benefit of the integrated layer processing include less memory cost, less memory access, less process latency, and compacted HW, which in turn leads to reduced power consumption. Also, the integrated layer processing gives more possibilities to process protocols on the fly.

According to another embodiment of the invention a method of decoding header information in which margins between protocol layers in the header information are deleted is provided. The method is substantially as that described in FIG. 7, with an additional step 73 at which margins between protocol layers in the header information are removed.

The method may be implemented in the form of a software application running on a computer system such as a mainframe, personal computer (PC), handheld computer, etc. Computer executable code adapted to perform step 73 of FIG. 7 is stored on a computer storage medium and run on the computer system.

The instructions may be of a type very long instruction word (VLIW) to make the instruction decoder simple and fast. Some vertical decoding is performed because the vertical decoding part is separated from the critical path. Therefore, the instructions are not necessary to be control signals directly. The vertical decoding in a non-critical path is used in order to avoid a too large program look-up table. Some parts of the program are stored in the PCB and in the CCB. The length of the instruction code is a trade off between the critical logic path length, the gate count, the memory cost, and the design time.

While the present application recites specific embodiments of the present application, it should be understood that many variations are possible. The present invention is intended to cover the full scope of variations available under the claims included herewith.

What is claimed is:

1. A method of processing first header information of a reception packet to provide instruction regarding processing of second header information, the method comprising the steps of:
   (a) separating error correction data, payload data and first header information from the reception packet; and
   (b) processing, in one clock cycle, the first header information in a protocol processor unit to provide, by an end of the one clock cycle, selected instructions for processing second header information.

2. The method of claim 1, further comprising:
   generating payload flags based on the selected instructions, wherein
   the payload flags are used by execution units for processing the accompanying payload data.

3. The method of claim 1, wherein the selected instructions are stored in at least one look up table and provided based on results of processing the first header information.

4. The method of claim 1, wherein the second header information is header information immediately following the first header information.

5. The method of claim 1, wherein step (b) comprises:
separating at least one field in the first header information for processing,
wherein the processing includes one of:
comparing the at least one field to predetermined data, and
processing the at least one field in an arithmetic and logic unit;
generating control signals and flags based on results of the comparing and processing;
matching the control signals and flags to instructions provided in a first look-up table; and
providing the selected instructions for processing the second header information based on the matched control signals and flags.

6. The method of claim 5, wherein a plurality fields are separated from the first header information, including at least a first field and a second field, where
the first field is compared to the predetermined data, and
the second field is processed in the arithmetic and logic unit.

7. The method of claim 1, wherein step (b) comprises:
separating a plurality of fields in the first header information;
comparing the plurality of fields with a plurality of parameters supplied from a second look-up table, simultaneously, using a plurality of comparators in a compare unit;
generating a match flag indicating a match between at least one of the plurality of fields and one of the plurality of parameters;
generating an address based on a result of the comparing;
matching the address to a value in a third look up table; and
using the matched value and the match flag to provide instructions for processing the second header information.

8. The method of claim 7, where the third look up table includes a plurality of individual look up tables, wherein
a first control signal provided from an instruction decoder selects one of the plurality of individual lookup tables in the third look up table, and
the address is matched to the value in the selected individual lookup table.

9. The method of claim 5, wherein when the step of comparing the at least one field to the predetermined value further comprises:
comparing a portion of the at least one field to the predetermined data when the at least one field is longer than a length of a comparator to generate a partial comparison result;
outputting the partial comparison result as long as a previous partial comparison result is a predetermined value; and
repeating the comparing step for each portion of the at least one field.

10. The method of claim 1, wherein margins between protocol layers of the header information are eliminated prior to processing.

11. The method of claim 1, wherein the error detection data is processed in parallel simultaneously with the processing of the first header information.

12. A protocol processor for processing first header information of a reception packet to provide instructions for processing second header information, comprising:
a buffer adapted to buffer header information separated out from the reception packet; and
a protocol processor unit adapted to process, in one clock cycle, the first header information sent from the buffer to provide, by an end of the first clock cycle, instructions regarding processing of the second header information of the reception packet.

13. The protocol processor of claim 12, wherein the protocol processor comprises a payload flag generating unit to generate payload flags based on the instructions, wherein
the payload flags are used by execution units to guide processing of the accompanying payload data.

14. The protocol processor of claim 12, further comprising at least one look up table in which the instructions are stored, wherein selected instructions are provided based on results of processing of the first header information.

15. The protocol processor of claim 12, wherein the second header information is header information immediately following the first header information.

16. The protocol processor according to claim 12, wherein the protocol processor unit further comprises:
a multiple field extractor adapted to extract at least one field of the first header information, where the at least one field is passed to one of:
a compare unit adapted to compare the at least one field to a predetermined value, and
an arithmetic and logic unit adapted to process the at least one field to provide updated connection state variables which are stored in a register file and arithmetic and logic unit flags;
a program control flag generation unit adapted to generate control signals and flags based on a result from the compare unit and the flags and state variables provided by the arithmetic logic unit; and
a program and instruction decoding unit adapted to match (a) the control signals and flags generated by the program control flag generating unit and (b) instructions in a first look up table, and to output selected instructions that match the control signals and flags, wherein the selected instructions are used in processing the second header information.

17. The protocol processor of claim 16, wherein the multiple field extractor extracts a plurality of fields from the first header information including at least a first field and a second field, where
the compare unit compares the first field to the predetermined value, and
the arithmetic and logic unit processes the second field to provide updated connection state variables which are stored in the register file and arithmetic and logic unit flags.

18. The protocol processor of claim 12, wherein the buffer is capable of buffering data words of different sizes and comprises:
a plurality of registers, one of the plurality of registers storing the first header information separated out from the reception packet being processed, and other ones of the plurality of registers being used to buffer header information when necessary.

19. The protocol processor of claim 16, wherein the program and instruction decoding unit further comprises:
a next program counter calculation unit adapted to determined a next program counter value based on the control signals and flags provided by the program control flag generation unit;

a program counter adapted to receive the next program counter value provided by the next program counter calculation unit and determine a program counter value based on the next program counter value;

wherein the first lookup table matches (a) the program counter value provided by the program counter to (b) a selected instruction, and an instruction decoder which receives the selected instruction from the first lookup table and decodes the instruction to provide decoded instructions used in decoding the second header information.

20. The protocol processor according to claim 16, further comprising:

a plurality of comparators adapted to perform a plurality of comparisons located in the compare unit;

a second look up table which receives a vector input and outputs a vector, parameters of which the at least one field is compared to using the plurality of comparators;

a flag to address translation unit which receives the result of the comparisons and generates a match flag indicating at least one of the plurality of parameters matches the at least one field of the first header information and an address corresponding to another flag generated based on a result of the multiple comparisons; and a third look up table which receives the address from the flag to address translation unit which is matched to a value in a third look up table; wherein the value matched in the third look up table and the match flag are passed to a next program counter calculation unit to provide a next program counter value which is passed to the program counter to be matched with an instruction in the first look up table to provide instructions for processing the second header information.

21. The protocol processor of claim 20, wherein the third look up table comprises a plurality of individual look up tables and a first control signal selects one of the plurality of look up tables and the address is matched to the value in the selected look up table.

22. The protocol processor unit of claim 16, wherein the compare unit compares a portion of the at least one field to the predetermined value when the at least one field is longer than a comparator to produce a partial comparison result, outputs the partial comparison result when a previous partial comparison result is of a predetermined value, and repeats the comparing for each portion of the at least one field.

23. The protocol processor of claim 12, further comprising:

an error correction accelerator unit adapted to process error correction data in parallel with the processing of first header information in the protocol processor unit.

24. The protocol processor of claim 12, wherein margins between protocol layers in the first header information are eliminated prior to processing in the protocol processor unit.

25. A program storage medium readable by a processor, tangibly embodying a program of instructions executed by the processor to perform method steps for processing first header information of a reception packet to provide instruction regarding processing of second header information, wherein the method steps comprise:

(a) separating error correction data, payload data and header information from the reception packet; and (b) processing, in one clock cycle, the first header information in a protocol processor unit to provide, by an end of the one clock cycle, selected instructions for decoding second header information.

26. The program storage medium of claim 25, wherein the method steps further include:

generating payload flags based on the selected instructions, wherein the payload flags are used by execution units to process the accompanying payload data.

27. The program storage medium of claim 23, wherein the selected instructions are stored in at least one look up table and are provided based on results of the processing of the first header information.

28. The program storage medium of claim 25, wherein the second header information is header information immediately following the first header information.

* * * * *